Jan. 19, 1932.  C. W. VAN RANST  1,841,510
AUTOMOBILE FRAME
Filed Sept. 20, 1929   2 Sheets-Sheet 1
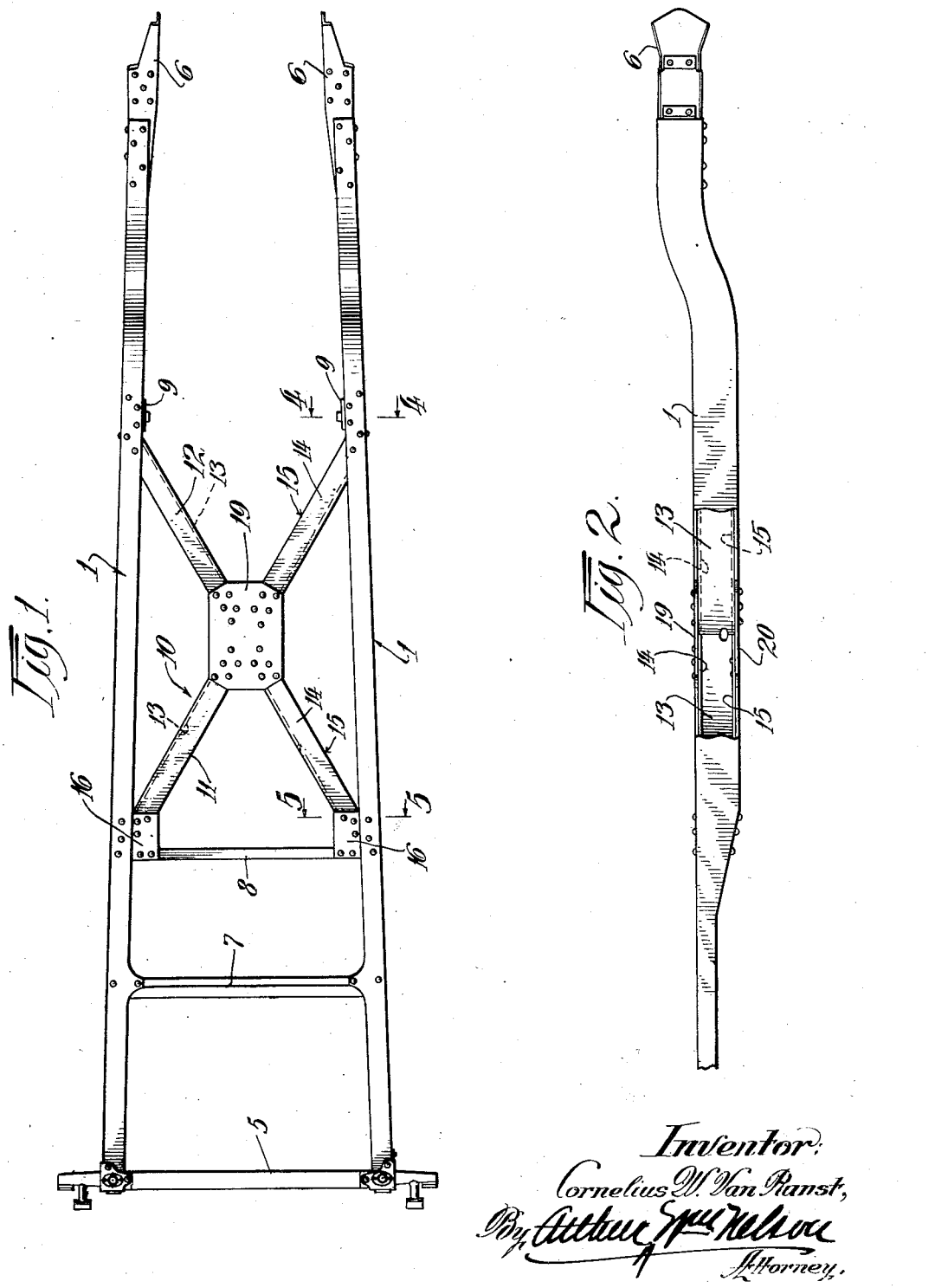

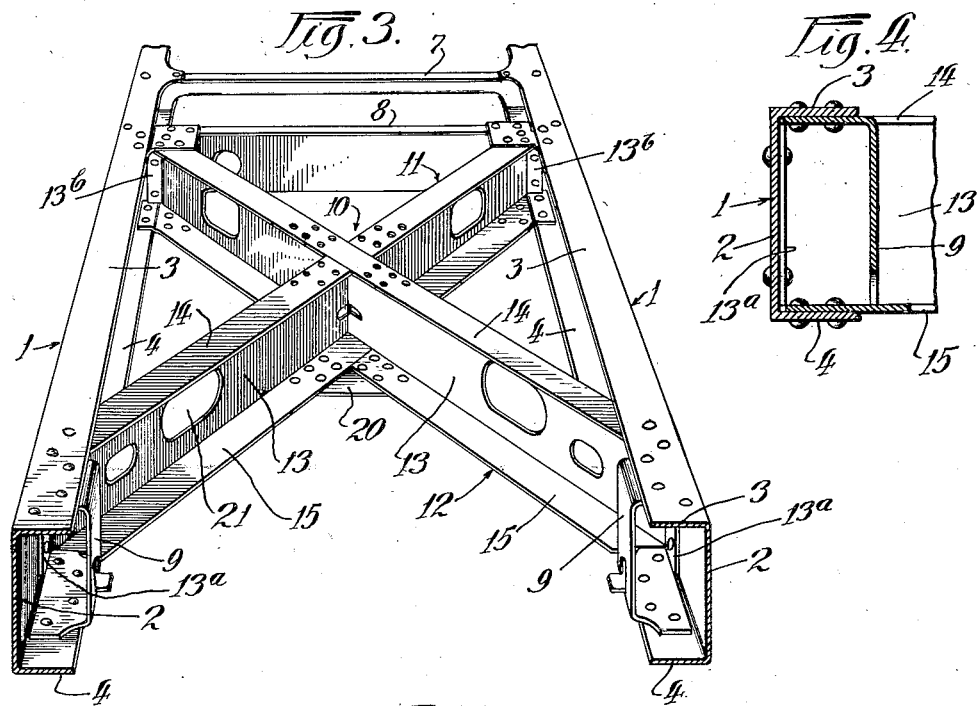
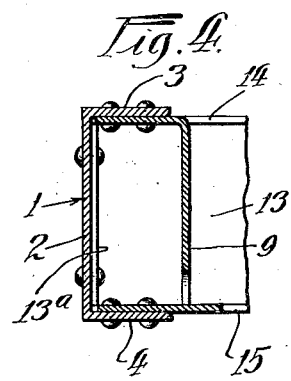
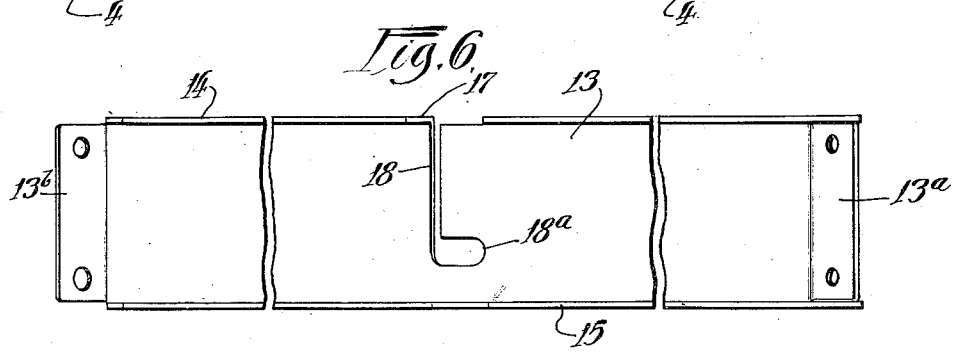
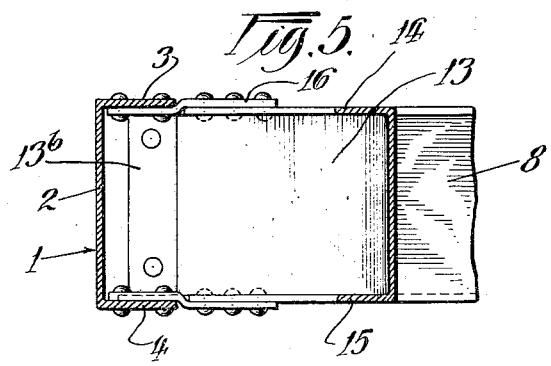

Patented Jan. 19, 1932

1,841,510

UNITED STATES PATENT OFFICE

CORNELIUS W. VAN RANST, OF AUBURN, INDIANA, ASSIGNOR TO MANNING & CO., OF CHICAGO, ILLINOIS, A CORPORATION OF ILLINOIS

AUTOMOBILE FRAME

Application filed September 20, 1929. Serial No. 393,892.

This invention relates to improvements in automobile frames and it consists of the matters hereinafter described and more particularly pointed out in the appended claims.

The primary object of the invention is to provide a strong rigid automobile frame which amply resists twisting under the great strains imposed upon it in actual use.

Another object of the invention is to provide a frame of this kind made of structural members and including an X shaped brace at substantially the mid portion thereof, the diagonal members of which are each continuous in length and are each connected at opposite ends with both side members of the frame and are so formed and arranged at their intersection as to mutually brace and reinforce each other.

These objects of the invention as well as others together with the many advantages thereof will more fully appear as I proceed with my specification.

In the drawings:—

Fig. 1 is a top plan view of an automobile frame embodying my invention.

Fig. 2 is a view in side elevation thereof with parts broken away to more clearly disclose the construction of the same.

Fig. 3 is a perspective view of that portion of the frame immediately associated with the X shaped brace of the same.

Fig. 4 is a transverse vertical detail sectional view on an enlarged scale through a part of the frame as taken on the line 4—4 of Fig. 1.

Fig. 5 is another transverse vertical detail sectional view through the frame as taken on the line 5—5 of Fig. 1.

Fig. 6 is a view in side elevation of one of the members forming the X shaped brace of the improved frame.

Referring now in detail to that embodiment of the invention illustrated in the accompanying drawings, my improved automobile frame includes side frame members 1—1, preferably made of channel stock, with the web 2 of each member disposed perpendicularly and with the horizontal top and bottom flanges 3 and 4 respectively thereof facing inwardly toward each other. As shown herein said frame members which are connected together at their rear ends by a cross member 5, converge toward their front ends which are offset or kicked upwardly as best shown in Fig. 2. To the kicked up front end of each frame member is secured an extension bracket 6, and to which are adapted to be secured certain duplex springs (not shown) when the frame is employed in a front wheel driven automobile. However, as said extension brackets and the springs associated therewith form no particular part of the present invention, they need not be further illustrated or described.

The said frame members are also connected together by other cross bars 7 and 8 respectively as best shown in Figs. 1 and 3, the latter member preferably being of a channel stock. As the frame herein illustrated is especially adapted for use in a front drive automobile wherein the engine, transmission and differential are mounted as a unitary structure at the front end of the frame, and as the engine is secured to said frame members so as to connect them together, it is apparent that the front end of the frame is devoid of cross bars or connecting members. Fixed to each side frame member at a point forward of the cross connecting member 8, is a bracket 9 to which the engine before mentioned (but not shown) is directly bolted.

That portion of the frame between the cross connecting member 8 and engine supporting brackets 9, fairly represents what may be aptly termed the "mid portion" of the frame as it is located substantially midway between the ends of said frame.

To brace said mid portion of the frame so as to hold it against twisting out of shape and plumb in the rough use it receives, I there provide an X shaped brace indicated as a whole by the numeral 10. Said brace comprises a pair of diagonal brace members 11 and 12 respectively each preferably made of channel stock of a height approximating that of the like stock of which the frame members are made. Each brace member includes a web 13 and top and bottom flanges 14 and 15 respectively and each member is rigidly fixed at one end to one frame member 1 near the cross member 8 and is fixed at its other end to the other frame member near an engine bracket 9.

The top and bottom flanges of each brace member at both ends thereof are cut away to provide front and rear end web extensions 13ª and 13ᵇ respectively and the front web extension of 13ª of each brace is bent to engage against and is riveted or otherwise secured against the inner face of the web 2 of the associated side frame member 1 adjacent an associated engine bracket 9. Those portons of the flanges 14 and 15 respectively of said brace member, adjacent the web extension 13ª and which engage within the webs of the side frame member are preferably riveted thereto as best shown in Figs. 3 and 4. The rear web extension 13ᵇ of each brace is bent to engage against and is riveted or otherwise secured to the web of the cross connecting member 8 near the ends thereof, which member as before mentioned is also made of channel stock. Preferably a plate 16 is provided at the top and bottom of the rear end of each brace bar and this plate is not only fixed to the web of the brace bar but is also fixed to the web of the associated frame member 1 and the cross connecting member 8 as best shown in Figs. 3 and 5 respectively.

Each brace member is so formed at its mid portion that they may intersect or cross each other and still be disposed in the same plane. To attain this construction I cut away a part of the top flange of one member and the bottom flange of the other as indicated at 17 in Fig. 6 and I also provide a slot 18 in the web of each brace member which opens through the associated cut away part of the flange. The parts are reversed in position and interengaged and thus provide a half-lap joint at said intersection as best shown in Fig. 3, and this type of joint brings the flanges of both brace members into the same plane. Top and bottom plates 19 and 20 respectively are disposed upon said intersecting parts of the brace members and are riveted or otherwise secured to the webs thereof as best shown in Figs. 1 and 3.

By the arrangement of the parts as above described, a strong and rigid construction is provided which securely hold the frame against twisting under the racking strains imposed upon it in actual road use.

Should such a frame brace be desired in a rear drive automobile wherein a propeller shaft must be accommodated, the slot 18 in the web of each structural member of the brace may terminate in an enlargement 18ª. When said brace is assembled both enlargements will register to provide the opening through the brace for such propeller shaft. To accommodate the usual engine exhaust pipes, brake operating members or conduits and the like, openings 21 may be provided in the webs of the brace parts for the passage of said parts therethrough.

While in describing the invention I have referred in detail to the form, arrangement and construction of the various parts thereof, the same is to be considered merely as illustrative of one phase of the invention so that I do not wish to be limited thereto except as may be specifically set forth in the appended claims.

I claim as my invention:—

1. An automobile frame embodying therein, a frame having side members and a cross connecting member, an X-shaped brace comprising two diagonally extending I-beam like members of substantially equal length, means for securing one end of each brace member to the cross bar and side members respectively, means for securing the other end of each brace member to said side members which brace members are so formed between their ends as to provide a half-lap joint, and plates securing said brace members together at the top and bottom of said joint.

2. An automobile frame embodying therein, a frame having side members and a cross connecting member, an X-shaped brace comprising two diagonally extending I-beam like members with the top and bottom flanges cut away to provide web extensions at each end, means for securing the web extension of one end of each brace member to the cross member and side members respectively, means for securing the web extension of the other end of each brace member to said side members which brace members are so formed between said ends as to provide a half-lap joint, and plates securing said brace members together at the top and bottom of said joint.

3. An automobile frame embodying therein, side members and two diagonal brace members of I-beam like shape having integral top and bottom flanges and a web connecting member, the top and bottom flanges of each member being cut away to provide web extensions at either end, means for securing the web extensions and the ends of the flanges to the side members, both of said brace members being formed at a point between their ends to provide a half-lap joint intersection, and plate members fixed to both of said brace members above and below said intersection.

4. An automobile frame embodying therein, side members having upper and lower spaced apart flanges directed toward each other and two diagonal brace members of substantially I-beam structure, the diagonal brace members being of less height than the side members to permit the ends of said diagonal brace members to fit snugly between the flanges of the side members, means for securing the ends of the diagonal brace members to the side frame members, both of said brace members being formed at a point between their ends to provide a half-lap joint intersection, and plate members fixed at both of said brace members above and below said intersection.

In testimony whereof, I have hereunto set my hand, this 17th day of September, 1929.

CORNELIUS W. VAN RANST.